(12) United States Patent
Suzuki

(10) Patent No.: US 9,608,246 B2
(45) Date of Patent: Mar. 28, 2017

(54) RESIN COMPOSITION, SEPARATOR FOR NON-AQUEOUS ELECTROLYTE SECONDARY BATTERY AND PRODUCTION METHOD THEREFOR, AND NON-AQUEOUS ELECTROLYTE SECONDARY BATTERY

(71) Applicant: SUMITOMO CHEMICAL COMPANY, LIMITED, Chuo-ku, Tokyo (JP)

(72) Inventor: Junji Suzuki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 44 days.

(21) Appl. No.: 14/399,650

(22) PCT Filed: Apr. 24, 2013

(86) PCT No.: PCT/JP2013/062742
§ 371 (c)(1),
(2) Date: Nov. 7, 2014

(87) PCT Pub. No.: WO2013/168662
PCT Pub. Date: Nov. 14, 2013

(65) Prior Publication Data
US 2015/0118539 A1    Apr. 30, 2015

(30) Foreign Application Priority Data

May 11, 2012   (JP) .................................. 2012-109218

(51) Int. Cl.
| | | |
|---|---|---|
| *H01M 4/13* | (2010.01) | |
| *H01M 2/16* | (2006.01) | |
| *H01M 2/14* | (2006.01) | |
| *H01M 10/05* | (2010.01) | |
| *C08L 23/22* | (2006.01) | |
| *C08K 3/00* | (2006.01) | |
| *H01M 10/052* | (2010.01) | |

(52) U.S. Cl.
CPC ......... *H01M 2/1653* (2013.01); *H01M 2/145* (2013.01); *H01M 2/1686* (2013.01); *H01M 10/05* (2013.01); *C08K 3/0033* (2013.01); *C08L 23/22* (2013.01); *H01M 10/052* (2013.01)

(58) Field of Classification Search
CPC ...... C08K 3/0033; C08L 23/22; H01M 10/05; H01M 10/052; H01M 2/145; H01M 2/1653; H01M 2/1686
See application file for complete search history.

(56) References Cited

U.S. PATENT DOCUMENTS

2010/0285348 A1*  11/2010  Murata ................... B32B 27/20
429/144

FOREIGN PATENT DOCUMENTS

| JP | 55-104360 A | 8/1980 |
|---|---|---|
| JP | 63-251436 A | 10/1988 |
| JP | 05-152167 A | 6/1993 |
| JP | 06-151252 A | 5/1994 |
| JP | 10-298523 A | 11/1998 |
| JP | 2005-149881 A | 6/2005 |
| JP | 2005-162843 A | 6/2005 |
| JP | 2006-351316 A | 12/2006 |
| JP | 2011-063808 A | 3/2011 |
| WO | 2008/093575 A1 | 8/2008 |

OTHER PUBLICATIONS

Nakazawa et al. (Imono (1988), vol. 60(5), p. 301-306).*

(Continued)

*Primary Examiner* — Patrick Ryan
*Assistant Examiner* — Ben Lewis
(74) *Attorney, Agent, or Firm* — Sughrue Mion, PLLC

(57) ABSTRACT

The present invention provides a resin composition comprising the following resin (a) and filler particles. The use of this composition makes it possible to obtain a separator having excellent heat resistance. Resin (a): a polymer which comprises a structural unit represented by a formula (1), and which has a weight average molecular weight of 200000 to 500000, provided that the polymer does not comprise a structural unit represented by a formula (2),

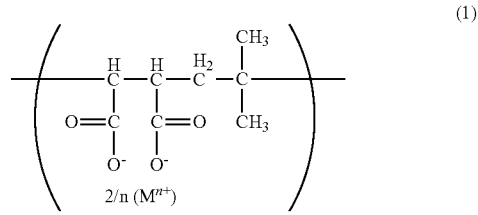

(1)

wherein, $M^{n+}$ represents a metal ion, and n represents the valence thereof,

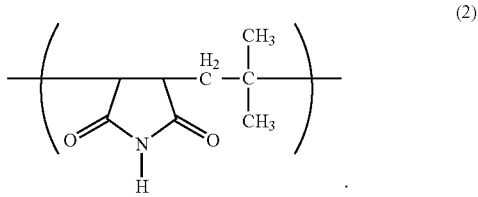

(2)

10 Claims, No Drawings

(56) References Cited

OTHER PUBLICATIONS

Machine-generated translation of JPA H10-298523 to Kuraray Co., Ltd., published Nov. 10, 1998.
Machine-generated translation of JPA H06-151252 to Hitachi AIC Inc., published May 31, 1994.
Machine-generated translation of JPA H05-152167 to Toyama Kakuhin Kogyo KK, published Jun. 18, 1993.
Machine-generated translation of JPA 2006-351316 to Denso Corp. et al., published Dec. 28, 2006.
Machine-generated translation of JPA 2005-149881 to Denso Corp. et al., published Jun. 9, 2005.
International Search Report of PCT/JP2013/062742 dated Jul. 23, 2013.
Communication dated Sep. 14, 2015, from the State Intellectual Property Office of the People's Republic of China in counterpart Application No. 201380024269.7.
Notice of Reasons for Rejection issued Nov. 10, 2015 in corresponding Japanese Patent Application No. 2012-109218 with translation.
Notice of Reasons for Rejection issued Apr. 5, 2016 in corresponding Japanese Patent Application No. 2012-109218 with translation.

\* cited by examiner

RESIN COMPOSITION, SEPARATOR FOR NON-AQUEOUS ELECTROLYTE SECONDARY BATTERY AND PRODUCTION METHOD THEREFOR, AND NON-AQUEOUS ELECTROLYTE SECONDARY BATTERY

CROSS-REFERENCE TO RELATED APPLICATIONS

This is a National Stage of International Application No. PCT/JP2013/062742 filed Apr. 24, 2013, claiming priority based on Japanese Patent Application No. 2012-109218 filed May 11, 2012, the contents of all of which are incorporated herein by reference in their entirety.

TECHNICAL FIELD

The present invention relates to a resin composition for a surface treatment of a separator substrate for a non-aqueous electrolyte secondary battery, a separator for a non-aqueous electrolyte secondary battery containing the resin composition and a method for producing the same, and a non-aqueous electrolyte secondary battery including the separator.

BACKGROUND ART

Patent Document 1 describes a resin composition containing polyvinyl alcohol and filler particles as a resin composition for a surface treatment of a separator substrate for a non-aqueous electrolyte secondary battery.

However, a separator, which is obtained by using the resin composition as a resin composition for a surface treatment of a separator substrate for a non-aqueous electrolyte secondary battery, does not necessarily have adequately satisfactory heat resistance. It is an object of the present invention to provide a separator having excellent heat resistance.

PRIOR ART DOCUMENT

Patent Document

Patent Document 1: WO 2008/093575

DISCLOSURE OF THE INVENTION

The present invention includes the inventions described in [1] to [11] below.

[1] A resin composition comprising the following resin (a) and filler particles.
  resin (a): a polymer which comprises a structural unit represented by a formula (1), and which has a weight average molecular weight of 200000 to 500000, provided that the polymer does not comprise a structural unit represented by a formula (2).

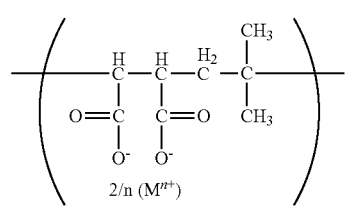

wherein, $M^{n+}$ represents a metal ion, and n represents the valence thereof.

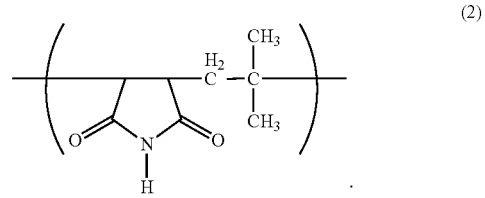

[2] The resin composition according to [1], wherein the metal ion represented by $M^{n+}$ in the formula (1) is an alkali metal ion.

[3] The resin composition according to [1], wherein the metal ion represented by $M^{n+}$ in the formula (1) is $Li^+$ or $Na^+$.

[4] The resin composition according to any one of [1] to [3], wherein a content of the structural unit represented by the formula (1) in the resin (a) is 90% by mole or more with respect to a total content of all structural units constituting the resin (a).

[5] The resin composition according to any one of [1] to [4], further comprising a solvent.

[6] A separator for a non-aqueous electrolyte secondary battery, the separator comprising a filler layer comprising the following resin (a) and filler particles, and a separator substrate for a non-aqueous electrolyte secondary battery.
  resin (a): a polymer which comprises a structural unit represented by a formula (1), and which has a weight average molecular weight of 200000 to 500000, provided that the polymer does not comprise a structural unit represented by a formula (2).

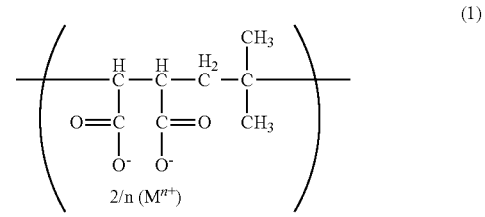

wherein, $M^{n+}$ represents a metal ion, and n represents the valence thereof.

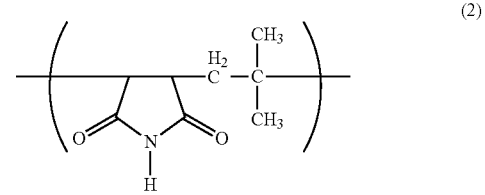

[7] The separator according to [6], wherein the separator substrate for a non-aqueous electrolyte secondary battery is a porous membrane of polyolefin.

[8] A method for producing a separator for a non-aqueous electrolyte secondary battery, the method comprising a step of applying the resin composition according to any one of [1] to [5] to a surface of a separator substrate.

[9] The production method according to [8], further comprising a step of drying the resultant applied product.

[10] The production method according to [8] or [9], wherein the separator substrate for a non-aqueous electrolyte secondary battery is a porous membrane of polyolefin.

[11] A non-aqueous electrolyte secondary battery comprising the separator according to [6] or [7].

When the resin composition of the present invention is used as a resin composition for a surface treatment of a separator substrate for a non-aqueous electrolyte secondary battery, a separator having excellent heat resistance is obtained.

Hereinafter, the present invention will be described in detail.

First, the resin (a) will be described.

The resin (a) is a polymer which includes a structural unit represented by the formula (1) above (hereinafter, may be referred to as a "structural unit (1)"), and has a weight average molecular weight of 200000 to 500000. However, the above-mentioned polymer does not include a structural unit represented by the formula (2) above (hereinafter, may be referred to as a "structural unit (2)"). The resin (a) may have a structural unit (hereinafter, may be referred to as a "structural unit (3)") other than the structural unit (1) and the structural unit (2), and the content of the structural unit (1) is usually 80% by mole or more, preferably 90% by mole or more, and more preferably 100% by mole (that is, a polymer consisting of the structural unit (1)) with respect to the total content of all structural units constituting the polymer. As a metal ion represented by $M^{n+}$ in the formula (1), alkali metal ions such as $Li^+$, $Na^+$ and $K^+$ and alkaline-earth metal ions such as $Mg^{2+}$ and $Ca^{2+}$ are preferred, alkali metal ions are more preferred, $Li^+$ or $Na^+$ is further preferred, and $Na^+$ is moreover preferred.

Examples of the structural unit (3) include structural units derived from vinyl esters of fatty acids with 2 to 16 carbon atoms, preferably 2 to 4 carbon atoms, such as vinyl acetate, vinyl propionate, vinyl butyrate, vinyl laurate, vinyl caproate, vinyl stearate, vinyl palmitate and vinyl versatate; structural units derived from acrylic acid alkyl esters having an alkyl group with 1 to 16 carbon atoms, such as methyl acrylate, ethyl acrylate, propyl acrylate, butyl acrylate, hexyl acrylate, octyl acrylate and lauryl acrylate; structural units derived from methacrylic acid alkyl esters having an alkyl group with 1 to 16 carbon atoms, such as ethyl methacrylate, propyl methacrylate, butyl methacrylate, hexyl methacrylate, octyl methacrylate and lauryl methacrylate; structural units derived from maleic acid dialkyl esters having an alkyl group with 1 to 16 carbon atoms, such as dimethyl maleate, diethyl maleate, dibutyl maleate, dioctyl maleate and dilauryl maleate; structural units derived from fumaric acid dialkyl esters having an alkyl group with 1 to 16 carbon atoms, such as dimethyl fumarate, diethyl fumarate, dibutyl fumarate, dioctyl fumarate and dilauryl fumarate; structural units derived from itaconic acid dialkyl esters having an alkyl group with 1 to 16 carbon atoms, such as diethyl itaconate, dibutyl itaconate, dihexyl itaconate, dioctyl itaconate and dilauryl fumarate; and the like.

Further, the structural unit (3) also includes the following structural unit:

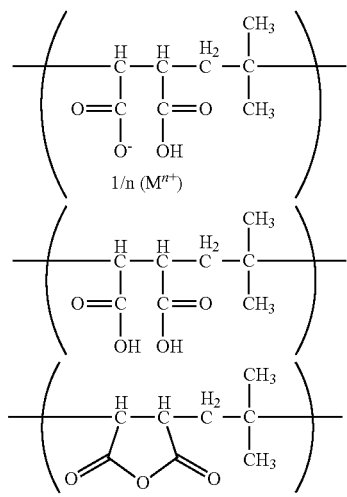

The resin (a) has a weight average molecular weight in a range of preferably 250000 to 400000, and more preferably 300000 to 350000.

For the resin (a), a metal salt of hydrolysate of a commercially available isobutylene-maleic anhydride copolymer such as ISOBAM (registered trademark) 18 can also be used, or a resin produced by appropriately adjusting the molecular weight thereof by any known method can also be used.

<Resin Composition for Surface Treatment of Separator Substrate for Non-Aqueous Electrolyte Secondary Battery (May be Referred to as "Resin Composition" Herein)>

As described above, the resin composition of the present invention contains the resin (a) and filler particles. Moreover, the resin composition preferably contains a solvent.

As the filler particles, fine particles of an inorganic material or fine particles of an organic material are used. Examples of the inorganic material include calcium carbonate, talc, clay, kaolin, silica, hydrotalcite, diatom earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite and glass. Examples of the organic material include homopolymer or copolymer of two or more kinds of styrene, vinyl ketone, acrylonitrile, methyl methacrylate, ethyl methacrylate, glycidyl methacrylate, glycidyl acrylate and methyl acrylate; fluororesins such as polytetrafluoroethylene, tetrafluoroethylene-hexafluoropropylene copolymer, tetrafluoroethylene-ethylene copolymer and polyvinylidene fluoride; melamine resin; urea resin; polyethylene; polypropylene; and polymethacrylate. Two or more kinds of fine particles may be mixed, or the same kind of fine particles having different particle size distributions may be mixed for using as the filler particles. As the material of the filler particle, alumina is preferred among these materials. The filler particles have an average particle size of preferably 3 μm or less, and more preferably 1 μm or less. The average particle size referred to herein is an average of primary particle diameters determined by SEM (scanning electron microscope) observation.

The amount of the filler particles to be used is preferably 1 to 1000 parts by weight, and more preferably 10 to 100 parts by weight with respect to 1 part by weight of the resin (a). When the amount of the filler particles to be used is too small, there is a possibility that the air permeability of the resulting separator is reduced and permeation of ions is reduced to deteriorate load characteristics of a battery. When the amount of the filler particles to be used is too large, there is a possibility that the dimension stability of the resulting separator is deteriorated.

Examples of the solvent include water and an oxygen-containing organic compound having a boiling point of 50 to 350° C. at normal pressures. Specific examples of the oxygen-containing organic compounds include compounds having an alcoholic hydroxyl group such as methanol, ethanol, n-propyl alcohol, isopropyl alcohol, n-butyl alcohol, isobutyl alcohol, s-butyl alcohol, amyl alcohol, isoamyl alcohol, methyl isobutyl carbinol, 2-ethylbutanol, 2-ethylhexanol, cyclohexanol, furfuryl alcohol, tetrahydrofurfuryl alcohol, ethylene glycol, hexylene glycol and glycerin; saturated aliphatic ether compounds such as propyl ether, isopropyl ether, butyl ether, isobutyl ether, n-amyl ether, isoamyl ether, methylbutyl ether, methyl isobutyl ether, methyl n-amyl ether, methylisoamyl ether, ethyl propyl ether, ethyl isopropyl ether, ethyl butyl ether, ethyl isobutyl ether, ethyl n-amyl ether and ethylisoamyl ether; unsaturated aliphatic ether compounds such as allyl ether and ethyl allyl ether; aromatic ether compounds such as anisole, phenetole, phenyl ether and benzyl ether; cyclic ether compounds such as tetrahydrofuran, tetrahydropyran and dioxane; ethylene glycol ether compounds such as ethylene glycol monomethyl ether, ethylene glycol monoethyl ether, ethylene glycol monobutyl ether, diethylene glycol monomethyl ether, diethylene glycol monoethyl ether and diethylene glycol monobutyl ether; monocarboxylic acid compounds such as formic acid, acetic acid, acetic acid anhydride, acrylic acid, citric acid, propionic acid and butyric acid; organic acid ester compounds such as butyl formate, amyl formate, propyl acetate, isopropyl acetate, butyl acetate, sec-butyl acetate, amyl acetate, isoamyl acetate, 2-ethyl hexyl acetate, cyclohexyl acetate, butylcyclohexyl acetate, ethyl propionate, butyl propionate, amyl propionate, butyl butyrate, diethyl carbonate, diethyl oxalate, methyl lactate, ethyl lactate, butyl lactate and triethyl phosphate; ketone compounds such as acetone, ethyl ketone, propyl ketone, butyl ketone, methyl isopropyl ketone, methyl isobutyl ketone, diisobutyl ketone, acetylacetone, diacetone alcohol, cyclohexanone, cyclopentanone, methylcyclohexanone and cycloheptanone; dicarboxylic acid compounds such as succinic acid, glutaric acid, adipic acid, undecanedioic acid, pyruvic acid and citraconic acid; and other oxygen-containing organic compounds such as 1,4-dioxane, furfural and N-methylpyrrolidone.

As the solvent, a mixture of water and the oxygen-containing organic compound may be used. A preferred mixing ratio of the oxygen-containing organic compound to 100 parts by weight of water is 0.1 to 100 parts by weight, more preferably 0.5 to 50 parts by weight, and moreover preferably 1 to 20 parts by weight.

The amount of the solvent to be used is not particularly limited and may be such an amount that a property, in which the application of the resin composition to a substrate which will be described later is easy, can be obtained. The solvent is mixed so that the amount of the solvent is preferably 1 to 1000 parts by weight, more preferably 2 to 500 parts by weight, further preferably 3 to 300 parts by weight and moreover preferably 5 to 200 parts by weight with respect to 1 part by weight of the resin (a).

The resin composition of the present invention may contain a dispersant, a plasticizer, a surfactant, a pH adjuster, an inorganic salt or the like within a range which does not impair the object of the present invention.

Among these, as the surfactant, a surfactant capable of improving the wettability for the substrate which will be described later is preferred, and examples thereof include NOPCO WET (registered trademark) 50 and SN wet 366 (both manufactured by SAN NOPCO LTD.).

The resin composition of the present invention may be produced by any method. Examples thereof include a method in which the filler particles are mixed with the resin (a), and then a solvent is added; a method in which the filler particles are mixed with a solvent, and then the resin (a) is added thereto; a method in which the filler particles, the resin (a) and a solvent are simultaneously added and mixed; and a method in which the resin (a) is mixed with a solvent, and then the filler particles are added thereto.

<Separator for Non-Aqueous Electrolyte Secondary Battery (May be Referred to as a "Separator" Herein)>

The separator of the present invention includes the resin (a), the filler particles and a separator substrate for a non-aqueous electrolyte secondary battery (may be referred to as a "substrate" herein). The separator is specifically a laminate including a layer containing the resin (a) and the filler particles (may be referred to as a "filler layer" herein), and a substrate layer, and preferably a laminate consisting of a substrate layer and a filler layer.

Examples of the substrate include thermoplastic resins such as polyolefin, glass fiber, porous polyester, aramid fiber, polybutylene terephthalate nonwoven fabric, para-type wholly aromatic polyamide, nonwoven fabric or porous membrane of fluorine-containing resins such as vinylidene fluoride, tetrafluoroethylene, copolymer of vinylidene fluoride and hexafluoropropylene and fluororubber, paper sheet of viscose rayon, natural cellulose or the like, mixed paper sheet obtained by papermaking of fiber of cellulose, polyester or the like, electrolytic paper, craft paper, Manila paper and Manila hemp sheet.

The substrate is preferably a porous membrane of polyolefin and more preferably contains a high molecular weight component having a weight average molecular weight of $5 \times 10^5$ to $15 \times 10^6$. Examples of the polyolefin include homopolymers or copolymers of ethylene, propylene, 1-butene, 4-methyl-1-pentene and 1-hexene. Among these, a copolymer predominantly comprising ethylene or a homopolymer of ethylene is preferred, and a homopolymer of ethylene, namely polyethylene, is more preferred.

The substrate has a porosity of preferably 30 to 80% by volume, and more preferably 40 to 70% by volume. When the porosity is less than 30% by volume, the amount of the electrolyte to be retained may be small, and when the porosity is more than 80% by volume, it may be insufficient to make a porous separator nonporous at high temperatures at which shutdown occurs. A pore size is preferably 3 μm or less, and more preferably 1 μm or less.

The thickness of the substrate is preferably 5 to 50 μm, and more preferably 5 to 30 μm. When the thickness is less than 5 μm, the shutdown characteristics (a porous separator becomes nonporous at high temperatures) of the separator may be insufficient, and when the thickness is more than 50 μm, since the thickness of the whole separator of the present invention is large, the electric capacitance of a battery may be reduced.

For such a substrate, a commercialized product having the above-mentioned characteristics can be used. Further, a production method for the substrate is not particularly limited, and any known method can be employed. Examples of the production method include a method in which a plasticizer is added to a thermoplastic resin and the resulting resin is formed into a film, and then the plasticizer is removed by using an appropriate solvent, as shown in JP-A-H07-29563, and a method in which a structurally weak amorphous portion of a film comprising a thermoplastic resin is selectively stretched to form a fine pore, as shown in JP-A-H07-304110.

The thickness of the filler layer is preferably 0.1 μm to 10 μm or less. When the thickness is less than 5 μm, it may be insufficient to make a porous separator nonporous at high temperatures at which shutdown occurs, and when the thickness is more than 10 μm, the load characteristics of the resulting non-aqueous electrolyte secondary battery may be deteriorated.

The separator of the present invention may include porous membrane layers, for example, an adhesion layer, a protective layer and the like other than the substrate layer and the filler layer within a range which does not impair the performance of the resulting non-aqueous electrolyte secondary battery.

The separator of the present invention has a value of air permeability of preferably 50 to 2000 seconds/100 cc, and more preferably 50 to 1000 seconds/100 cc. When the value of air permeability is lower, it is preferred since the load characteristics of the resulting non-aqueous electrolyte secondary battery is more improved; however, when the value of air permeability is lower than 50 seconds/100 cc, it may be insufficient to make a porous separator nonporous at high temperatures at which shutdown occurs. When the value of air permeability is higher than 2000 seconds/100 cc, the load characteristics of the resulting non-aqueous electrolyte secondary battery may be deteriorated.

<Method for Producing Separator>

The method for producing a separator of the present invention may be, for example, a method comprising a step of applying the resin composition of the present invention to a support other than a substrate to prepare a laminate comprising the support and a filler layer, a step of drying the obtained laminate, a step of separating the dried laminate into the filler layer and the support, and a step of press-bonding the filler layer to the substrate; however, it is preferred to employ a method comprising a step of applying the resin composition of the present invention to a surface of a substrate to prepare a laminate comprising the substrate and a filler layer. Moreover, the method for producing a separator of the present invention more preferably comprises a step of drying the obtained laminate. The substrate may be previously subjected to a corona treatment before the resin composition of the present invention is applied to the surface of the substrate.

A method for applying the resin composition of the present invention to the surface of the substrate or the support other than the substrate can be carried out by a method industrially usually performed such as application by a coater (also referred to as a doctor blade) or application by brush coating. The thickness of the filler layer can be controlled by adjusting the thickness of an applied film, the concentration of the resin (a) in the resin composition, a ratio between the amounts of the filler particles and the resin (a), and the like. As the support other than the substrate, a film made of resin, a belt made of metal, a drum and the like can be used.

The phrase "drying of a laminate" in the present invention means that a solvent (hereinafter, may be referred to as a "solvent (b)") mainly contained in the filler layer of the laminate is removed. Such drying is carried out, for example, by evaporating the solvent (b) from the filler layer by heating means using a heating device such as a hot plate or depressurizing means using a depressurizing device, or combined means thereof. The conditions of the heating means or the depressurizing means can be appropriately selected within a range which does not deteriorate the air permeability of the substrate layer according to the kind of the solvent (b), and the like. For example, in the case of a hot plate, the surface temperature of the hot plate is preferably set to temperatures equal to or lower than the melting point of the substrate layer. Further, in the depressurizing means, the laminate may be put in an appropriate depressurizing machine and the internal pressure of the depressurizing machine may be reduced to about 1 to $1.0\times10^5$ Pa. Further, it is also possible that a solvent (hereinafter, may be referred to as a "solvent (c)"), which is dissolved in the solvent (b) but which does not dissolve the used resin (a), is prepared, and the filler layer of the laminate is immersed in the solvent (c) to replace the solvent (b) with the solvent (c), and thereby the resin (a) in the filler layer is precipitated and the solvent (c) is removed and the solvent (c) is removed by drying.

<Non-Aqueous Electrolyte Secondary Battery (Hereinafter, May be Referred to as a "Battery")>

The battery of the present invention includes the separator of the present invention. Hereinafter, components other than the separator of the present invention will be described with reference to the case where the battery of the present invention is a lithium ion secondary battery; however, the present invention is not limited to this example.

A lithium ion secondary battery includes, for example, electrodes (positive electrode and negative electrode), an electrolyte and a separator, and is a battery in which oxidation/reduction of lithium are performed at both the positive electrode and the negative electrode to store or release electrical energy.

(Electrode)

The electrode includes a positive electrode and a negative electrode for a secondary battery. The electrode generally has a state in which an electrode active material and, if necessary, a conductive material are applied to at least one surface (preferably both surfaces) of a current collector through a binding agent.

As the electrode active material, an active material capable of absorbing and releasing lithium ions is preferably used. The electrode active material includes a positive electrode active material and a negative electrode active material.

Examples of the positive electrode active material include composite metal oxides, particularly composite metal oxides containing at least one metal of lithium, iron, cobalt, nickel and manganese, and preferred examples thereof include active materials containing $Li_xMO_2$ (wherein M represents one or more kinds of transition metals and preferably represents at least one of Co, Mn and Ni, and $1.10>x>0.05$), or $Li_xM_2O_4$ (wherein M represents one or more kinds of transition metals and preferably represents Mn, and $1.10>x>0.05$), for example, composite oxides represented by $LiCoO_2$, $LiNiO_2$, $Li_xNi_yCo_{(1-y)}O_2$ (wherein $1.10>x>0.05$, $1>y>0$) or $LiMn_2O_4$.

Examples of the negative electrode active material include various silicon oxides ($SiO_2$, etc.), carbonaceous materials, and metal composite oxides, and preferred examples thereof include carbonaceous materials such as amorphous carbon, graphite, natural graphite, MCMB, pitch-based carbon fiber and polyacene; composite metal oxides represented by $A_xM_yO_z$ (wherein A represents Li, M represents at least one selected from Co, Ni, Al, Sn and Mn, O represents an oxygen atom, and x, y, and z are respectively numbers satisfying the ranges of $1.10 \geq x \geq 0.05$, $4.00 \geq y \geq 0.85$, $5.00 \geq z \geq 1.5$) and other metal oxides.

Examples of the conductive material include conductive carbons such as graphite, carbon black, acetylene black, Ketjen black and activated carbon; graphite conductive materials such as natural graphite, thermally expansible graphite, scaly graphite and expansible graphite; carbon fibers such as vapor-grown carbon fibers; metal fine particles or metal fibers such as aluminum, nickel, copper, silver, gold or platinum; conductive metal oxides such as ruthenium oxide and titanium oxide; and conductive polymers such as polyaniline, polypyrrole, polythiophene, polyacetylene and polyacene.

Carbon black, acetylene black, and Ketjen black are preferred in that the conductivity is effectively improved at a low amount.

The content of the conductive material is, for example, preferably 0 to 50 parts by weight, and more preferably 0 to 30 parts by weight with respect to 100 parts by weight of the electrode active material.

Examples of the material of the current collector include metals such as nickel, aluminum, titanium, copper, gold, silver, platinum, aluminum alloy and stainless steel; carbon materials or activated carbon fibers coated with nickel, aluminum, zinc, copper, tin, lead or alloys thereof by plasma spraying or arc spraying; and conductive films formed by dispersing a conductive material in rubber or resin such as styrene-ethylene-butylene-styrene (SEBS) copolymer.

Examples of the form of the current collector include a foil, a flat plate, a mesh form, a net form, a lath form, a punched form, an embossed form, and the form of combination thereof (e.g., meshed flat plate).

A surface of the current collector may be etched to form projections and depressions.

Examples of the binding agent include fluorinated polymers such as polyvinylidene fluoride; diene polymers such as polybutadiene, polyisoprene, isoprene-isobutylene copolymer, natural rubber, styrene-1,3-butadiene copolymer, styrene-isoprene copolymer, 1,3-butadiene-isoprene-acrylonitrile copolymer, styrene-1,3-butadiene-isoprene copolymer, 1,3-butadiene-acrylonitrile copolymer, styrene-acrylonitrile-1,3-butadiene-methyl methacrylate copolymer, styrene-acrylonitrile-1,3-butadiene-itaconic acid copolymer, styrene-acrylonitrile-1,3-butadiene-methyl methacrylate-fumaric acid copolymer, styrene-1,3-butadiene-itaconic acid-methyl methacrylate-acrylonitrile copolymer, acrylonitrile-1,3-butadiene-methacrylic acid-methyl methacrylate copolymer, styrene-1,3-butadiene-itaconic acid-methyl methacrylate-acrylonitrile copolymer and styrene-acrylonitrile-1,3-butadiene-methyl methacrylate-fumaric acid copolymer; olefin polymers such as ethylene-propylene copolymer, ethylene-propylene-diene copolymer, polystyrene, polyethylene, polypropylene, ethylene-vinyl acetate copolymer, ethylene ionomer, polyvinyl alcohol, vinyl acetate polymer, ethylene-vinyl alcohol copolymer, chlorinated polyethylene, polyacrylonitrile, polyacrylic acid, polymethacrylic acid and chlorosulfonated polyethylene; styrene polymers such as styrene-ethylene-butadiene copolymer, styrene-butadiene-propylene copolymer, styrene-isoprene copolymer, styrene-n-butyl acrylate-itaconic acid-methyl methacrylate-acrylonitrile copolymer and styrene-n-butyl acrylate-itaconic acid-methyl methacrylate-acrylonitrile copolymer; acrylate polymers such as poly (methyl methacrylate), poly(methyl acrylate), poly(ethyl acrylate), poly (butyl acrylate), acrylate-acrylonitrile copolymer and 2-ethylhexyl acrylate-methyl acrylate-acrylic acid-methoxy polyethyleneglycol monomethacrylate; polyamide and polyimide polymers such as polyamide 6, polyamide 66, polyamide 11, polyamide 12, aromatic polyamide and polyimide; ester polymers such as polyethylene terephthalate and polybutylene terephthalate; cellulose polymers (including salts (ammonium salt, alkali-metal salt) thereof) such as carboxymethyl cellulose, carboxyethyl cellulose, ethyl cellulose, hydroxymethyl cellulose, hydroxypropyl cellulose and carboxyethylmethyl cellulose; block copolymers such as styrene-butadiene block copolymer, styrene-butadiene-styrene block copolymer, styrene-ethylene-butylene-styrene block copolymer, styrene-isoprene block copolymer and styrene-ethylene-propylene-styrene block copolymer; ethylene-vinyl chloride copolymer and ethylene-vinyl acetate copolymer; and others such as methyl methacrylate polymer. Further, the resin (a) may be used as the binding agent.

(Electrolyte)

Examples of the electrolyte to be used for a lithium ion secondary battery include non-aqueous electrolytes obtained by dissolving a lithium salt in an organic solvent. Examples of the lithium salt include one kind among $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, lower aliphatic lithium carbonate and $LiAlCl_4$, and mixtures of two or more kinds thereof.

Among these, lithium salts containing at least one selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$, respectively containing fluorine, are preferably used as the lithium salt.

As the organic solvent to be used in the above-mentioned electrolytes, it is possible to use, for example, carbonates such as propylene carbonate, ethylene carbonate, dimethyl carbonate, diethyl carbonate, ethylmethyl carbonate, 4-trifluoromethyl-1,3-dioxoran-2-one and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetoamide; carbamates such as 3-methyl-2-oxazolidone; sulfur-containing compounds such as sulfolane, dimethyl sulfoxide and 1,3-propanesultone; or the above-mentioned organic solvents having a fluorine substituent introduced therein, and a mixture of two or more thereof is usually used.

The shape of the battery of the present invention is not particularly limited and includes a laminate shape, a coin shape, a cylindrical shape, and a prismatic shape.

Hereinafter, the present invention will be described by way of examples; however, the present invention is not limited to these examples.

The properties of separators were measured by the following methods in the following example, comparative example and reference example.

(1) Dimension retention: A separator was cut out into a piece 5-cm square, a marking line of 4-cm square was drawn in the center of the piece, and the piece was sandwiched between two sheets of paper and held for one hour in an oven at 150° C. The piece was then taken out and the dimension of the drawn square was measured to calculate dimension retention. A calculation method of the dimension retention is as follows.

Length of marking line in machine direction (MD) before heating: L1

Length of marking line in transverse direction (TD) before heating: W1

Length of marking line in machine direction (MD) after heating: L2

Length of marking line in transverse direction (TD) after heating: W2

Dimension retention in machine direction (MD) (%)=L2/L1×100

Dimension retention in transverse direction (TD) (%)=W2/W1×100

(2) Air permeability: in accordance with JIS P 8117

PRODUCTION EXAMPLE 1

Production of Substrate Porous Film

Ultra-high molecular weight polyethylene powder (70 parts by weight) (340 M, produced by Mitsui Chemicals, Inc.), 30 parts by weight of polyethylene wax (FNP-0115, produced by NIPPON SEIRO CO., LTD.) having a weight average molecular weight of 1000, 0.4 parts by weight of an antioxidant (IRGANOX (registered trademark) 1010, produced by Ciba Specialty Chemicals), 0.1 parts by weight of an antioxidant (IRGAFOS (registered trademark) P168, produced by Ciba Specialty Chemicals), and 1.3 parts by weight of sodium stearate were mixed, and to the resulting mixture, calcium carbonate (produced by MARUO CALCIUM CO., LTD.) having an average particle size of 0.1 μm was added so as to be 38% by volume with respect to the whole volume of the resulting mixture. These materials were mixed as powder by a Henschel mixer, and then melt-kneaded by a twin-screw kneader to obtain a polyolefin resin composition. The polyolefin resin composition was rolled with a pair of roller whose surface temperature was 150° C. to prepare a sheet. The sheet was immersed in an aqueous hydrochloride solution (hydrochloric acid 4 mole/L, non-ionic surfactant 0.5% by weight) to remove calcium carbonate, subsequently stretched by 6 times at 105° C., and subjected to a corona treatment at 50 W/(m²/minute) to obtain a substrate porous film (thickness 16.6 μm) made of a polyethylene porous membrane.

PRODUCTION EXAMPLE 2

Production of Aqueous Resin (a) Solution

Sodium hydroxide (41.5 g) was dissolved in 566.0 g of ion-exchanged water, and to the resulting aqueous alkaline solution, 100 g of isobutylene-maleic anhydride copolymer (ISOBAM (registered trademark) 18, produced by KURARAY CO., LTD., weight average molecular weight 300000 to 350000) was gradually added, and after the completion of the addition, the resulting mixture was dissolved under stirring at 100° C. for 5 hours. After the dissolution, the resulting aqueous solution was cooled to normal temperature, water was supplied by the same amount as that lost by evaporation during the dissolution to obtain an aqueous solution of a resin (a) whose solid content was 20% by weight. The resin (a) contained in the aqueous solution is substantially consisting of the structural unit (1), and $M^{n+}$ is $Na^+$.

EXAMPLE 1

Production of Resin Composition and Separator

Alumina fine particles (100 parts by weight) ("AKP3000" (trade name) produced by Sumitomo Chemical Co., Ltd.), 3 parts by weight (as a resin solid content) of the 20% by weight aqueous solution of the resin (a) obtained in Production Example 2, and 34 parts by weight of isopropyl alcohol were mixed, and to the resulting mixture, water was added so that a solid content was 23% by weight, and the resulting mixture was stirred and mixed by a planetary centrifugal mixer. The resulting mixture was stirred and mixed with a thin-film spin system high-speed mixer (FILMIX (registered trademark), manufactured by PRIMIX Corporation) to obtain the resin composition of the present invention as a uniform slurry. The resin composition was uniformly applied to one side of the substrate porous film obtained in Production Example 1 with a multi labo coater, and the resin composition applied was dried at 60° C. for 5 minutes in a drying machine to obtain a separator for a non-aqueous electrolyte secondary battery.

The weight per unit area of the resin composition of the obtained separator was 10.92 g/m² (sodium salt of ISOBAM (registered trademark) 18: 0.32 g/m², alumina: 10.60 g/m²). The properties of the separator are as follows.

(1) Dimension retention: 100% in machine direction (MD) and 100% in transverse direction (TD)

(2) Air permeability: 87 seconds/100 cc

COMPARATIVE EXAMPLE 1

A separator for a non-aqueous electrolyte secondary battery was obtained in the same manner as in Example 1 except for using 10% by weight aqueous solution of polyvinyl alcohol (produced by Wako Pure Chemical Industries, Ltd., Wako first class, average degree of polymerization 3100 to 3900, degree of saponification 86 to 90% by mole) in place of the 20% by weight aqueous solution of the resin (a) obtained in Production Example 2.

The weight per unit area of the resin composition of the obtained separator was 8.96 g/m² (polyvinyl alcohol: 0.26 g/m², alumina: 8.70 g/m²). The properties of the separator are as follows.

(1) Dimension retention: 43% in machine direction (MD) and 60% in transverse direction (TD)

(2) Air permeability: 94 seconds/100 cc

REFERENCE PRODUCTION EXAMPLE 1

An aqueous resin solution in which a solid content was 20% by weight was obtained by using ISOBAM (registered trademark) (produced by KURARAY CO., LTD., weight average molecular weight 55000 to 65000) in place of ISOBAM (registered trademark) 18, as the isobutylene-maleic anhydride copolymer in Production Example 2.

REFERENCE COMPARATIVE EXAMPLE 1

A separator for a non-aqueous electrolyte secondary battery was obtained in the same manner as in Example 1 except for using the aqueous solution of the resin obtained in Reference Production Example 1 described above in place of the 20% by weight aqueous solution of the resin (a) obtained in Production Example 2.

REFERENCE PRODUCTION EXAMPLE 2

An aqueous resin solution in which a solid content was 20% by weight was obtained by using ISOBAM (registered trademark) 06 (produced by KURARAY CO., LTD., weight average molecular weight 80000 to 90000) in place of ISOBAM (registered trademark) 18, as the isobutylene-maleic anhydride copolymer in Production Example 2.

REFERENCE COMPARATIVE EXAMPLE 2

A separator for a non-aqueous electrolyte secondary battery was obtained in the same manner as in Example 1 except for using the aqueous solution of the resin obtained in Reference Production Example 2 described above in place of the 20% by weight aqueous solution of the resin (a) obtained in Production Example 2.

REFERENCE PRODUCTION EXAMPLE 3

An aqueous resin solution in which a solid content was 20% by weight was obtained by using ISOBAM (registered trademark) 10 (produced by KURARAY CO., LTD., weight average molecular weight 160000 to 170000) in place of ISOBAM (registered trademark) 18, as the isobutylene-maleic anhydride copolymer in Production Example 2.

REFERENCE COMPARATIVE EXAMPLE 3

A separator for a non-aqueous electrolyte secondary battery was obtained in the same manner as in Example 1 except for using the aqueous solution of the resin obtained in Reference Production Example 3 described above in place of the 20% by weight aqueous solution of the resin (a) obtained in Production Example 2.

REFERENCE COMPARATIVE EXAMPLE 4

A separator for a non-aqueous electrolyte secondary battery was obtained in the same manner as in Example 1 except for using a 20% by weight aqueous solution of an ammonia-modified product of isobutylene-maleic anhydride copolymer (ISOBAM (registered trademark) 110, produced by KURARAY CO., LTD., weight average molecular weight 160000 to 170000) in place of the 20% by weight aqueous solution of the resin (a) obtained in Production Example 2.

The properties of the separators obtained in Reference Comparative Examples 1 to 4 are described in Table 1 together with the properties of the separators of Example 1 and Comparative Example 1.

TABLE 1

|  | $M^{n+}$ | Weight average molecular weight | Dimension retention in machine direction |
|---|---|---|---|
| Example 1 | $Na^+$ | 300000-350000 | 100% |
| Reference Comparative Example 1 | $Na^+$ | 55000-65000 | 73% |
| Reference Comparative Example 2 | $Na^+$ | 80000-90000 | 65% |
| Reference Comparative Example 3 | $Na^+$ | 160000-170000 | 60% |
| Reference Comparative Example 4 | $NH_4^+$ | 160000-170000 | 18% |
| Comparative Example 1 |  | polyvinyl alcohol | 43% |

It can be said that when the separator has higher dimension retention, the separator has excellent heat resistance. Further, it can be said that when the separator has a lower value of air permeability, the separator has better ion permeability and excellent load characteristics.

INDUSTRIAL APPLICABILITY

When the resin composition of the present invention is used as a resin composition for a surface treatment of a separator substrate for a non-aqueous electrolyte secondary battery, a separator having excellent heat resistance is obtained. A non-aqueous electrolyte secondary battery including such a separator is excellent in safety.

The invention claimed is:

1. A resin composition comprising the following resin (a) and filler particles:
   resin (a): a polymer which comprises a structural unit represented by a formula (1), and which has a weight average molecular weight of 200000 to 500000, provided that the polymer does not comprise a structural unit represented by a formula(2);

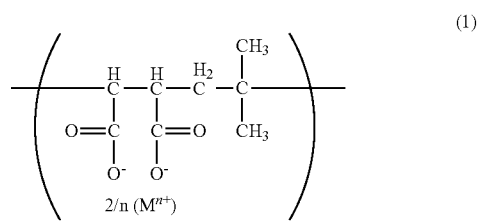

wherein, Mn+ represents a metal ion, and n represents the valence thereof; and wherein a content of the structural unit represented by the formula (1) in the resin (a) is 90% by mole or more with respect to a total content of all structural units constituting the resin (a)

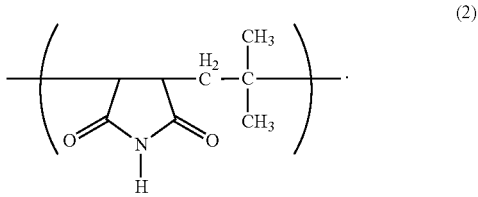

2. The resin composition according to claim 1, wherein the metal ion represented by Mn+ in the formula (1) is an alkali metal ion.

3. The resin composition according to claim 1, wherein the metal ion represented by Mn+ in the formula (1) is Li+ or Na+.

4. The resin composition according to claim 1, further comprising a solvent.

5. A method for producing a separator for a non-aqueous electrolyte secondary battery, the method comprising a step of applying the resin composition according to claim 1 to a surface of a separator substrate.

6. The production method according to claim 5, further comprising a step of drying the resultant applied product.

7. The production method according to claim 5, wherein the separator substrate for a non-aqueous electrolyte secondary battery is a porous membrane of polyolefin.

8. A separator for a non-aqueous electrolyte secondary battery, the separator comprising a filler layer comprising the following resin (a) and filler particles, and a separator substrate for a non-aqueous electrolyte secondary battery:
   resin (a): a polymer which comprises a structural unit represented by a formula (1), and which has a weight average molecular weight of 200000 to 500000, provided that the polymer does not comprise a structural unit represented by a formula (2);

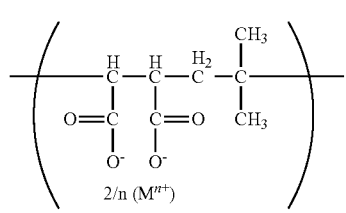 (1)

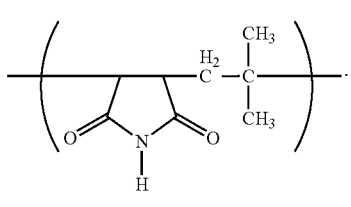 (2)

wherein, Mn+ represents a metal ion, and n represents the valence thereof; and wherein a content of the structural unit represented by the formula (1) in the resin (a) is 90% by mole or more with respect to a total content of all structural units constituting the resin (a)

9. The separator according to claim 8, wherein the separator substrate for a non-aqueous electrolyte secondary battery is a porous membrane of polyolefin.

10. A non-aqueous electrolyte secondary battery comprising the separator according to claim 8.

\* \* \* \* \*